(12) United States Patent
Martinez et al.

(10) Patent No.: US 12,317,152 B1
(45) Date of Patent: May 27, 2025

(54) ACTIVE ALERT SYSTEM BASED ON COMBINATORIAL ANALYSIS OF EVENT DATA AND IOT DATA

(71) Applicant: United Services Automobile Association (USAA), San Antonio, TX (US)

(72) Inventors: Noe Alberto Martinez, San Antonio, TX (US); Marta Leigh Argumedo, Helotes, TX (US); Jose L. Romero, Jr., San Antonio, TX (US); Andre Rene Buentello, San Antonio, TX (US); Paula Ann Whittington, Helotes, TX (US); Desmond Montrell Savage, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 246 days.

(21) Appl. No.: 18/090,902

(22) Filed: Dec. 29, 2022

(51) Int. Cl.
*H04W 4/02* (2018.01)
*G01W 1/10* (2006.01)
*G06N 10/20* (2022.01)
*G06Q 50/26* (2012.01)

(52) U.S. Cl.
CPC .............. *H04W 4/023* (2013.01); *G01W 1/10* (2013.01); *G06N 10/20* (2022.01); *G06Q 50/265* (2013.01)

(58) Field of Classification Search
CPC ........ H04W 4/023; G06N 10/20; G01W 1/10; G06Q 50/265
See application file for complete search history.

(56) References Cited

U.S. PATENT DOCUMENTS

2018/0165418 A1\* 6/2018 Swartz ................... G16H 50/70

\* cited by examiner

*Primary Examiner* — Curtis B Odom
(74) *Attorney, Agent, or Firm* — Fletcher Yoder, P.C.

(57) ABSTRACT

A method may include receiving static input data comprising a plurality of heath states for individuals over a period of time with respect to respective locations, receiving event scenario data comprising expected paths for weather events, and generating a quantum health state model based on the static input data and the event scenario data. The quantum health state model may evaluate each health state with respect to the individuals at the respective locations and the weather events in superposition. The method may receive dynamic input data associated with the individuals and a plurality of sensors acquired after the first dataset. The method may determine that an individual of the plurality of individuals is associated with a health data value that is greater than a threshold based on the quantum health state model and the dynamic input data and automatically transmit notifications indicative of the expected location to devices.

20 Claims, 3 Drawing Sheets

ACTIVE ALERT SYSTEM BASED ON COMBINATORIAL ANALYSIS OF EVENT DATA AND IOT DATA

BACKGROUND

The present disclosure is related to providing notification and relief services based on event data and internet-of-things (IoT) data. More specifically, the present disclosure is related to performing combinatorial analysis using quantum computing systems to efficiently identify and assist individuals that may be at risk during weather or other natural phenomenon events.

Different types of events, such as weather events, may be predicted to traverse certain geographic areas based on modeling software used to simulate a projected path of the event. Often times, these models are updated based on additional information related to the weather event itself. However, other data sources that may not be directly related to respective event may be useful to more accurately update a prediction model. However, incorporating these other data sources into respective prediction models may be challenging to implement due to the vast computing resources involved to determine updates to the prediction model while the respective event is on route.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method may include receiving, via at least one qubit processor, static input data comprising a first dataset associated with a plurality of health states for a plurality of individuals over a period of time with respect to a plurality of respective locations. The method may also involve receiving event scenario data comprising a plurality of expected paths for one or more weather events and generating a quantum health state model based on the static input data and the event scenario data. The quantum health state model is configured to evaluate each of the plurality of health states with respect to the plurality of individuals at the plurality of respective locations and the one or more weather events in superposition. The method may also include receiving dynamic input data comprising a second dataset associated with the plurality of individuals and a plurality of sensors acquired after the first dataset, such that the second dataset comprises a plurality of updated health states for the plurality of individuals, a plurality of updated respective locations for the plurality of individual, updated data related to the plurality of expected paths, or any combination thereof. The method may then involve determining that an individual of the plurality of individuals is associated with a health data value that is greater than a threshold based on the quantum health state model and the dynamic input data, identifying one or more individuals associated with one or more devices located within a threshold distance of an expected location of the individual, and automatically transmitting one or more notifications indicative of the expected location to the one or more devices.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, certain events, such as weather events (e.g., hurricane, wildfires, flooding), may be anticipated by weather authorities and organizations. These organizations may use various types of modeling software to predict certain weather conditions that may be present in the coming days. The modeling software uses input data related to the event to determine a likely or expected path of the weather event over a geographical area. Different organizations and modeling software employ different algorithms that uses different sets of input data to generate and update the expected path model. As a result, each organization or modeling software may yield a different expected path model that covers different geographic areas.

In addition, during a weather-related event, individuals may become distressed or positioned in a precarious location where the individuals may seek assistance. It may be useful to cross reference an individual's current location, as obtained via internet-of-things (IoT) data, with an expected path for a weather event to determine a likelihood that the individual is in a distressed state. However, the correlation between the location of the individual and a location of a weather event may not be directly attributable to the individual's state of mind or health. As such, additional IoT data from wearable devices and the like associated with the individual may be used with the location data described above to better ascertain whether the individual is in a distressed state (e.g., heartrate above threshold).

With the foregoing in mind, the present embodiments disclosed herein may use data acquired from internet-of-things (IoT) devices to generate expected behavior models for individuals. That is, the IoT devices may provide indicators related to the individual's health (e.g., heartrate, pulse) over time as the individual conducts various routine and non-routine activities over a period of time. The IoT model may then represent an individual's expected locations over a period of time and the individual's corresponding health data during the same period of time as the individual travels to the expected locations. After generating the IoT model for an individual, weather event data (e.g., data directly associated or measured with respect to the weather event) may be acquired and analyzed in combination with the IoT model to generate a quantum health state model for the individual. That is, the quantum health state model for the user may provide expected health data for the individual at various times based on expected path models associated with various types of weather events. The expected health data may be utilized to determine a distress level or state of the individual, such that an alert system may issue notifications to certain devices located within a proximity of the expected location of the individual. The notifications may include information concerning the individual and the individual's expected health data to allow another individual to assist the distressed individual.

In some cases, alerts for locate certain individuals may be sent to a number of devices that cover a specific geographical area (e.g., city, county). However, due to the large area covered by the alerts, many individuals may ignore or disregard the alert assuming that another individual may assist the one in need. By employing the techniques described herein, IoT model data for other individuals or IoT data indicative of locations of other individuals may be retrieved based on their proximities to the individual identified as being in a distressed state. In this way, those individuals that receive alerts via respective devices may be more proactive with regard to locating and assisting the distressed individual.

To efficiently process and generate or update an expected health state model, a quantum computing prediction system may be employed to perform a combinatorial analysis to determine expected health states of individuals over time with respect to a variety of weather events. Indeed, the number of data sources that provide relevant data during the course of a weather event varies in real time. Further, the volume of data provided to the quantum computing prediction system to analyze the weather event data and the IoT data may overwhelm other computing systems. However, since the quantum computing prediction system operates using quantum mechanics and qubits, the data acquired from various IoT data sources may be evaluated simultaneously with the weather data in an efficient matter. That is, the quantum computing prediction system may evaluate the various sources of data in a variety of states (e.g., conditions present or not present) in superposition (e.g., conditions present and not present at the same time) to update the expected health state model for a user during a weather event in real time to provide notifications to individuals within a certain proximity of a user at a particular time.

Indeed, as advances continue in the quantum computing field, quantum computers with processors equipped with over 100 qubits are capable of performing different types of combinatorial analysis for various types of problems. That is, these quantum computers can represent each individual input variable in a multidimensional space as a one bit, a zero bit, and as both: a one bit and a zero bit at the same time or simultaneously. As a result, these quantum computers may employ quantum wave interference to simultaneously analyze a number of input variables relevant to a combinatorial optimization problem to find an optimal (e.g., highest probability of success) solution to the problem. In this way, performing combinatorial analysis that may involve a significant amount of computing resources by a classical supercomputer may be performed using less resources in a more efficient manner via a quantum computer.

With the foregoing in mind, a quantum model may be generated to represent a plurality of solutions to a combinatorial optimization problem by simultaneously evaluating a plurality of input variable states. The quantum model may thus enable users to have vast improvements in cryptography, data analytics, forecasting, pattern matching, and so forth. Indeed, after a particular input variable state of the quantum model is observed or measured by an individual considering the problem, the quantum model may immediately yield a solution for the optimization problem because the quantum model has already computed all of the solutions, thereby enabling additional processes or services to be initiated in an efficient amount of time. For instance, after detecting the presence of a weather event, a quantum model for the weather event may be generated to represent a plurality of solutions for an individual's health state to ensure safety based on datasets provided from a wide variety of sources. The plurality of solutions may be filtered to identify a subset of solutions that have the highest probabilities of achieving any defined goal. As more data is collected into the quantum model, the subset of solutions may converge to a small set of solutions that may be presented to an individual or group of individuals that may be located within a proximity of the distressed individual, such that they may perform a welfare check or assist the distressed individual.

Although the present embodiments described herein may be implemented for any individual, it may be beneficial for those individuals that may be handicapped, elderly, or in general need of additional support from other individuals. That is, certain individuals may be more susceptible to becoming distressed in view of weather events or other events. As such, those who care for or steward over these individuals may desire to predict whether these individuals will be distressed during certain types of weather events and times in which these individuals may request assistance. Indeed, by evaluating the IoT data and the weather event data simultaneously using a combinatorial analysis technique enabled by a quantum model may allow notifications to be sent in real time or within seconds of the individual being in need of assistance or becoming distressed. That is, the present embodiments allow for computing resources to be used more efficiently to reduce the power consumed by computing resources and the processing time employed by respective computing devices to identify those distressed individuals, thereby improving the operations of the respective machines performing these tasks. Additional details with regard to coordinating notification services using combinatorial analysis of event data will be discussed below with reference to FIGS. 1-4.

Figure 1:
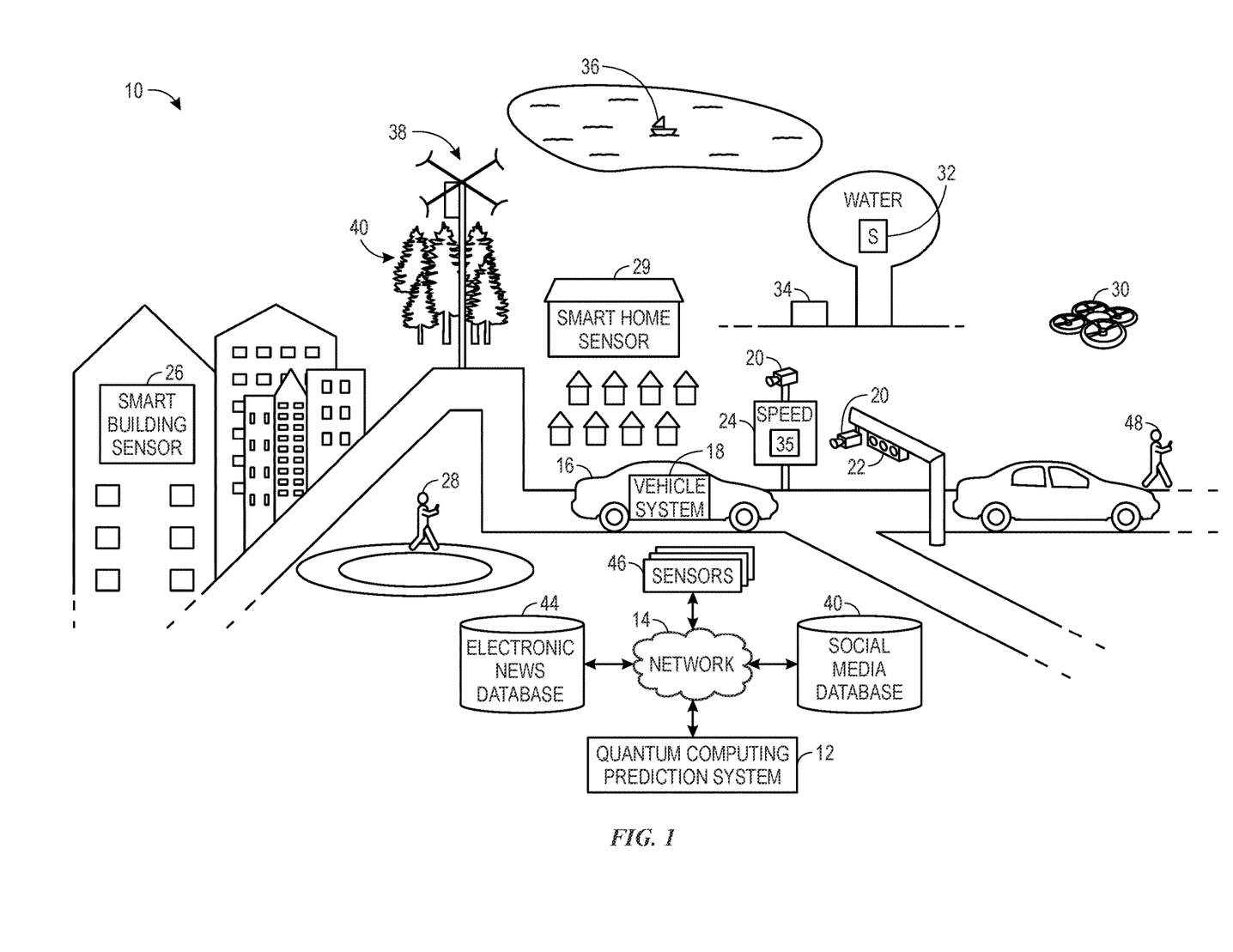
FIG. 1 is a diagram of a system including a variety of data sources that may be provided to a quantum computing prediction system to perform combinatorial analysis in accordance with aspects of the present disclosure.

By way of introduction, FIG. 1 illustrates a diagram of a system (e.g., a smart city) 10 that includes a variety of data sources to assist a quantum computing prediction system 12, according to an embodiment of the present disclosure. Referring to FIG. 1, the system 10 may include a network 14 that may receive relevant data from the variety of data sources and transmit the data received from the data sources to the quantum computing prediction system 12. As will be discussed in greater detail below, the quantum computing prediction system 12 may simultaneously process the relevant data using quantum computing operations to efficiently account for effects of weather events and update their projected paths. Moreover, the quantum computing prediction system 12 may coordinate or automate certain actions or commands in view of the updated path predictions and the various devices or individuals that may be projected to be along the predicted paths. That is, in some embodiments, the quantum computing prediction system 12 may generate a coordinated set of instructions to various devices (e.g., sprinklers, drones, dams) to modify operations in conjunction with each other to assist individuals in view of the event.

The network 14 may receive data regarding operations, location, and other properties related to vehicles 16 via vehicle systems 18. For example, the vehicle system 18 may include speed data or location data, which the quantum computing prediction system 12 may use to collect various types of data (e.g., temperature, occupancy, traffic) in the area at a given moment. In certain embodiments, the vehicle 16 may include a video system (e.g., image and audio sensors that collect image and audio data), which may capture real-time area data (e.g., vehicle traffic in the area, pedestrian traffic in the area, weather conditions) at a street level and send the captured data to the quantum computing prediction system 12. In some embodiments, the video system may include an image sensor or any suitable a camera to capture real-time image data.

The system 10 may also include the cameras 20 that may be affixed to a traffic light 22 or a speed detector 24. The traffic light 22 (or traffic sign, or dedicated data collection device like a traffic collection tower) and the speed detector 24 may send collected data to the quantum computing prediction system 12 via the network 14 or any other suitable communication protocol. For example, the traffic light 22 may send data regarding the number of vehicles 16 passing the traffic light 22. The traffic light 22 may also receive commands (e.g., from the quantum computing prediction system 12) causing the traffic light 22 to turn red, yellow, green, flash yellow, flash red, and so on.

The speed detector 24 may send data to the quantum computing prediction system 12 regarding the posted speed limit in the area, and the speed detector 24 may receive commands (e.g., from the quantum computing prediction system 12) causing the speed detector 24 to dynamically change the posted speed limit of the area (e.g., to slow the traffic in the area to facilitate an emergency response). While traffic lights are discussed, it should be noted that any controllable assets (e.g., electronic buoys, or other markers or indicators that may be disposed within or alongside a waterway, air traffic control lights, and so on) may be employed in the embodiments described herein.

The quantum computing prediction system 12 may collect, via the network 14, data from building sensors 26. The building sensors 26 may be coupled to structures (e.g., buildings, bridges, roads, and so on). The building sensors 26 may include a vibration sensor, a seismometer, a seismograph (e.g., to detect and record seismic events, volcanic activity, explosions, collisions, falling objects, etc.), water level sensors, humidity sensors, heat sensors, infrared sensors, or any other appropriate sensor that may provide information related to the ambient environment within or outside a building. For example, a water sensor may be used to determine flooding on a street including depth and force/speed, while heat sensors and/or infrared sensors may assist in locating a fire, determining where the fire may have originated, determining in which direction the fire is traveling, and so on.

The quantum computing prediction system 12 may also collect data from and/or about individuals in the area. For example, the individuals may be wearing wearable devices 28 that may include medical, biometric and/or location tracking devices. The quantum computing prediction system 12 may track the location and health of the individuals via the wearable devices 28, which may provide information related to the presence of individuals in various locations. The wearable devices 28 may detect health state data associated with the user wearing the respective device. The health state data may include heartrate, pulse, number of calories burned, number of steps taken, number of exercise minutes performed, body temperature, blood-oxygen saturation level, heart-rate variability, strength measurements, and other data from other biometric sensor devices.

Additionally, the quantum computing prediction system 12 may receive data from smart home sensors 29. The smart home sensors 29 may include devices that may be positioned in a home or building and may be connected to a network. The smart home sensors 29 may include contact sensors that detect a position of door or other physical component, motion sensors that track movement of objects, vibration sensors, sound sensors that detect noise, water sensors that detect the presence of water or liquid in a location, temperature/humidity sensors, light (e.g., ultraviolet, infrared) sensors, smoke/carbon dioxide/gas sensors, electricity usage sensors, and the like. The smart home sensors 29 may also include devices that perform certain home automation operations. The devices may include smart plug-in devices that control the flow of electricity to connected devices, smart doorbells that track movement outside of the home and doorbell usages, security cameras that record objects present in its view under various conditions, smart thermostats that may control the heating and air conditioning systems, smart appliances (e.g., refrigerator, vacuum cleaner) that perform specific operations, smart assistant devices that respond to audio commands, listen to ambient noises that may be present, and control operations of connected devices, smart light fixtures, smart plumbing devices, and the like.

In addition to the devices described above, in some embodiments, drones 30 (e.g., unmanned aerial vehicles) may be employed to collect traffic data, image data, and the like. The drones 30 may be ground-based drones that traverse roads and different terrains via the air or surface to collect various types of data. In some situations, the drones may be waterborne. Other drones might traverse fluid pipes, gas pipes, drainage pipes, chimneys, caves, service tunnels, crawl spaces, attics, basements, parking garages, subways, etc. In this way, the drones may be positioned in the area and provide data to the quantum computing prediction system 12 or other suitable device to perform the embodiments described herein.

The system 10 may also include a water tower sensor 32 that may detect water level in a water tower that provides clean water to residents of a city or area. The water tower sensor 32 be communicatively coupled to a water pump 34 that may pump water to various destination ports or from the water tower.

A smart buoy 36 may provide information related to a body of water, such as reservoir, river, lake, drainage area, or the like. The smart buoy 36 may detect a water level, wind speed, water temperature, water acidity level, and other properties related to a body of water.

In some embodiments, a wind sensor 38 may detect a wind speed, air quality properties (e.g., carbon monoxide, acid gases, smoke properties), and the like. One or more wind sensors 38 may be positioned at various locations within the system 10. In some cases, the wind sensor 38 may be positioned in a forest area 40 or other wooded area to track wind patterns. Based on the measurements from the wind sensor 38 in the forest area 40, the quantum computing prediction system 12 may track or predict paths for forest fires or other nuisances that may be influenced by the wind.

Additional data may be acquired by smart mobile devices 48 owned and carried by individuals. The smart mobile devices 48 may include any suitable device that may communicate data with the network 14. As such, the smart mobile device 48 may include smart phones, smart watches, network-enabled tablet devices, and the like. The smart mobile devices 48 may include location services that track a location of the respective device.

As mentioned above, the quantum computing prediction system 12 may be communicatively coupled to the sensors and devices described above via the network 14 or some suitable communication protocol. In addition, relevant data may also be gathered from social media database 42. Using web crawlers or other web monitoring tools, the quantum computing prediction system 12 may track or receive information related to area data (e.g., regarding traffic), event data (e.g., text-based social media posts, pictures, videos of weather events, seismic events, conflagrations), or emergency resource data (e.g., text-based social media posts, pictures, videos of emergency responders). The social media database 42 may include data available via social media sites such as Facebook®, Twitter®, and the like. In one embodiment, the social media database 42 may include information associated with the individuals, businesses, organizations, governmental agencies, news outlets, and the like. For example, the data of the social media database 42 may be associated with the location of a user or a destination of the user. The social media database 42 may also include data trending on social media sites that may not be directly associated with any particular measurement described above. However, the trending data may provide the quantum computing prediction system 12 additional data that may be related to the data collected from the sources described above. For instance, the data from the social media database 42 may include information regarding a natural phenomenon or any disruptive situation and may be correlated or verified with data acquired from the sensors or devices mentioned above or other suitable devices and sensors.

Additionally, the system 10 may include an electronic news database 44, which may include information provided by various news services that may be updated in real-time or near real time via a network (e.g., Internet). The electronic news database 44 may provide information regarding weather alerts, natural phenomenon alerts, non-natural phenomenon alerts (e.g., traffic, active shooter), and any other information that may be published via an electronic news outlet such as a webpage, news database, or the like. As such, the quantum computing prediction system 12 may become aware of the likelihood of a disruptive event affecting a certain area.

In addition to the data sources mentioned above, the quantum computing prediction system 12 may collect data from a wide variety of sensors 46. The sensors 46 may include any type of device capable of detecting location, moisture, temperature, light, and the like. One or more sensors 46 may be disposed on different types of property such as an individual, a home, a vehicle, and the like. In certain embodiments, one or more sensors 46 may be disposed within certain rooms of the home, outside the home, within the vehicle, or outside the vehicle. The sensors 46 may also be disposed on devices carried by or worn by individuals. For example, the sensors 46 may be disposed on mobile phones, wearable electronics, and the like. In one embodiment, the sensors 46 may provide location information regarding the sensors 46. As such, the sensors 46 may provide global positioning system (GPS) coordinates and the like to indicate a location of the sensors 46.

Figure 2:
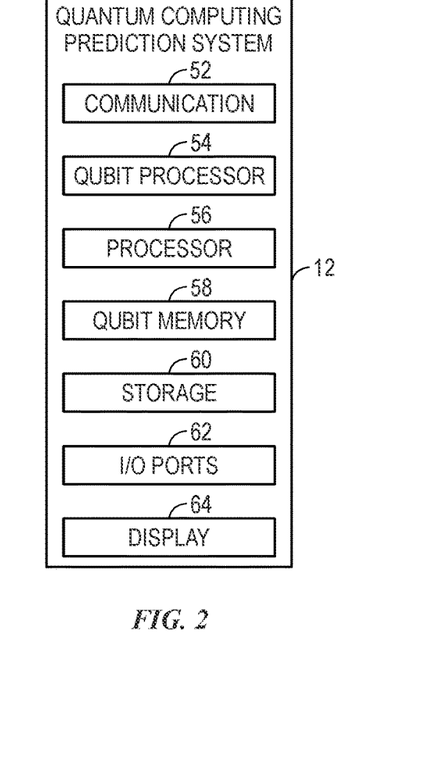
FIG. 2 is a block diagram of example components within the quantum computing prediction system, in accordance with aspects of the present disclosure.

The quantum computing prediction system 12 may then use the collected data for additional analysis in accordance with the embodiments presented herein. Before describing the analysis operations, FIG. 2 is a block diagram of example components that may be part of the quantum computing prediction system 12, according to an embodiment of the present disclosure. Although the following description details some example components that make up the quantum computing prediction system 12, it should be understood that the quantum computing prediction system 12 may include additional or fewer components.

Referring now to FIG. 2, the quantum computing prediction system 12 may include a communication component 52, a qubit processor 54, a host processor 56, a qubit memory 58, a storage 60, input/output (I/O) ports 62, a display 64, and the like. The communication component 52 may be a wireless or wired communication component that may facilitate communication between the quantum computing prediction system 12, various types of devices, the network 14, and the like. Additionally, the communication component 52 may facilitate data transfer to the quantum computing prediction system 12, such that the quantum computing prediction system 12 may receive data from the other components depicted in FIG. 1 and the like.

The qubit processor 54 may be any type of quantum processing unit (QPU) that provides a computational unit that relies on quantum principles to perform a task. In some embodiments, the qubit processor may include a qubit random access memory that includes registers and gates, a quantum control unit that drives qubits to desired states, and a classical control interface that can facilitate interactions between the host processor 56 capable of executing computer-executable code to instruct the qubit processor 54 to perform certain analysis operations (e.g., combinatorial analysis). The processor 56 may also include multiple processors that may perform the operations described below.

The qubit memory 58 may include one or more qubits that make up basic units of quantum memory. Each qubit may be either a 0, 1, or both 0 and 1 via superposition. As such, an 8-qubit memory may represent all numbers 0 through 255 at the same time. The qubits may be realized using a variety of approaches including photonics, trapped ions, semiconductors, superconducting material, and the like.

The storage 60 may be any suitable articles of manufacture that can serve as media to store processor-executable code, data, or the like. These articles of manufacture may represent computer-readable media (e.g., any suitable form of memory or storage) that may store the processor-executable code used by the qubit processor 54, the processor 56, or both to perform the presently disclosed techniques. The storage 60 may also be used to store data, various other software applications for analyzing the data, and the like. The storage 60 may represent non-transitory computer-readable media (e.g., any suitable form of memory or storage) that may store the processor-executable code used by the qubit processor 54, the processor 56, or both to perform various techniques described herein. It should be noted that non-transitory merely indicates that the media is tangible and not a signal.

The I/O ports 62 may be interfaces that may couple to other peripheral components such as input devices (e.g., keyboard, mouse), sensors, input/output (I/O) modules, and the like. The display 64 may operate to depict a representation of the 3D AR or VR visualizations associated with software or executable code being processed by the qubit processor 54, the processor 56, or both. In one embodiment, the display 64 may be a touch display capable of receiving inputs from a user of the quantum computing prediction system 12.

It should be noted that the components described above with regard to the quantum computing prediction system 12 are exemplary components and the quantum computing prediction system 12 may include additional or fewer components as shown. In addition, although the components are described as being part of the quantum computing prediction system 12, the components may also be part of any suitable computing device described herein such as the vehicle system 18, the speed detector (e.g., speedometer) 24, the traffic light 22, the sensors 46, and the like to perform the various operations described herein.

Figure 3:
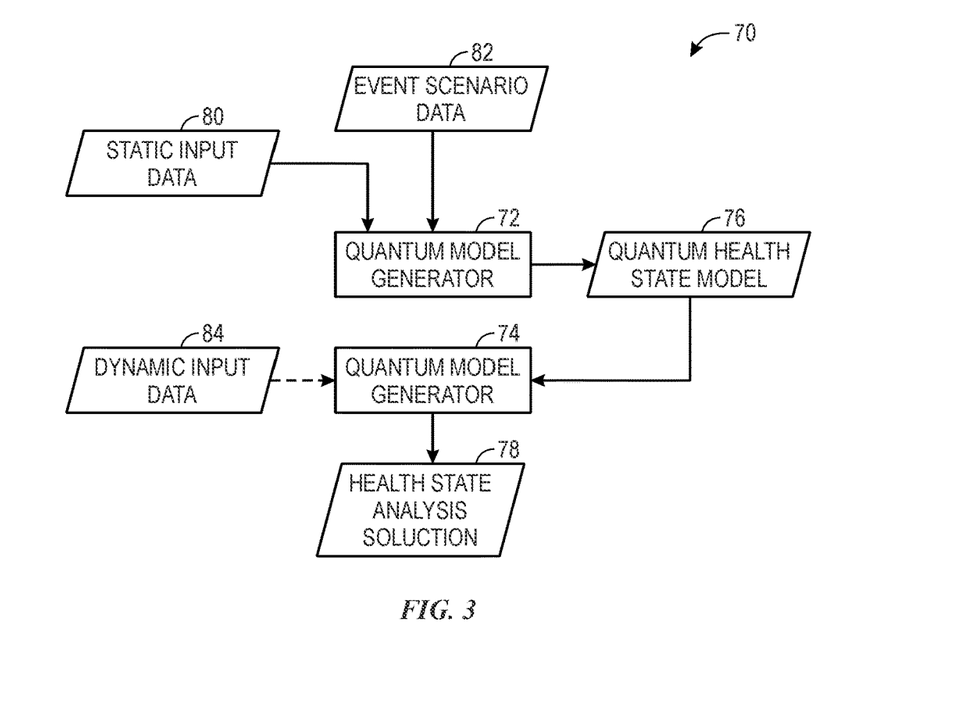
FIG. 3 is a data flowchart of a method for generating and updating quantum health state models using static and dynamic data sources, in accordance with aspects of the present disclosure.

Keeping this in mind, FIG. 3 illustrates a data flowchart 70 for performing combinatorial analysis described herein using quantum computing techniques. For instance, the quantum computing prediction system 12 may include a quantum model generator 72 and a solution filter system 74 to produce a quantum health state model 76 and an health state analysis solution 78 to a particular event-oriented problem in accordance with embodiments described herein.

Referring now to FIG. 3, static input data 80 may include data concerning one or more individuals at various times over a time period. As such, the static input data 80 may include data acquired from any suitable data source described above with reference to FIG. 1. For example, the static input data 80 may include data acquired from the wearable devices 28, the vehicle system 18 associated with the individuals, the smart home sensor 29 associated with the individuals, the smart mobile device 48 associated with the individuals, or the like. In addition, the static input data 80 may include information related to an individual(s) or an entity that may describe aspects of the respective individual(s). For example, the static input data 80 may include insurance policy information that details personal data (e.g., age, sex, weight) concerning the individual. In addition, the static input data 80 may include information related to properties owned or operated by the individual or entities. The property data may provide descriptions of the property, an approximate value of the property, location of the property, and the like. The property may include any type of physical property, such as vehicle, home, office building, commercial complex, or the like.

In some embodiments, the static input data 80 may include health state data associated with the individuals over a period of time, as each individual travels to different locations, and the like. Generally, the static input data 80 may track different health states for the individuals at different times, at different locations, while performing certain tasks (e.g., as detected by the wearable device 28, the sensors 46), and the like. As mentioned above, the health state may correspond to different physiological properties associated with the individuals as measured by respective devices. By way of example, the wearable devices 28 may measure a heartrate, pulse, perspiration level, or other biometric measurement that may be representative of each individual's current temperament, anxiety level, state of mind, or health. Indeed, each of the measured parameters may correspond to a respective threshold for each respective individual that may be determined based on a statistical analysis (e.g., average, mean, median) of the measurements acquired over a period of time, while each individual performs certain tasks, while each individual visits certain locations, and the like. Based on a comparison between the measured value and a corresponding threshold, the health state data may indicate that each individual is in a positive health state (e.g., below a threshold) or a negative health state (e.g., above a threshold).

In addition to the static input data 80, the quantum model generator 72 may also receive event scenario data 82, which may correspond to various types of events that the quantum computing prediction system 12 may evaluate in conjunction with the static input data 80. The event scenario data 82 may include various types of weather events, such as windstorms, dust storms, wildfires, flooding, hurricanes, tornados, and the like. The event scenario data 82 may be defined for various locations within a geographic area. In some embodiments, the event scenario data may be defined by a user or determined over time based on information gleaned from the electronic news database 44. That is, a machine learning algorithm may monitor news articles or electronic sources of data provided in the electronic news database 44 over time and track different weather events that occur in different geographic areas. As events are identified and determined to be likely to occur in a particular location or area (e.g., occurred more than one time within two years), the machine learning algorithm may add the event as part of the event scenario data 82.

In some embodiments, the quantum model generator 72 may track the event scenario data 82 with respect to static input data 80 for individuals that may experience the corresponding weather events. That is, health state data may be acquired via respective devices associated with other individuals as they experience various weather events. Based on information (e.g., height, weight, cholesterol level, race, gender, age) related to each respective individual, the quantum model generator 72 may determine correlations between the health state data and corresponding weather events for different clusters (e.g., similar age range) of individuals.

In addition, the event scenario data 82 may include a number of projections for a weather event that has been identified as a threat to the respective area. As such, the event scenario data 82 may include a number of different projected travel paths for a weather event based on a number of different models used to predict the paths. In some embodiments, the event scenario data 82 may be provided after the threat of a weather event occurring in an area is determined to be above some threshold, expected to arrive within some period of time, or the like.

After receiving the static input data 80 and the event scenario data 82, the quantum model generator 72 may analyze or determine the effects of the various weather events provided in the event scenario data 82 to the individuals' health state data provided in the static input data 80. That is, the quantum model generator 72 may simultaneously evaluate a number of different types of weather events and their expected effects on the individuals' health states over a certain period of time. For example, the event scenario data 82 may indicate that a hurricane-type weather event may occur in an area that corresponds to the system 10 of FIG. 1. Previous hurricane weather events in the area are associated with historical paths in which the hurricane traveled, types of damage sustained in the respective area, other types of weather events (e.g., flooding, wind) that coincide with the hurricane, and the like. With this in mind, the quantum model generator 72 may generate the quantum health state model 76 that evaluates each attribute associated with the previous hurricanes with respect to the properties, the states of various data sources detected based on the sources provided via the system 10, the detected health state data for individuals, the expected locations of individuals, and the like in superposition. That is, the quantum health state model 76 may be stored in the qubit memory 58 as a model that evaluates each of the historical paths of the hurricane with respect to the current data (e.g., location of the individual, health state data of the individual) of the system 10 provided within the static input data 80 simultaneously.

By way of operation, the quantum model generator 72 may simultaneously evaluate the effects of the event scenario data 82 with respect to the properties associated with the static input data 80. As such, the quantum health state model 76 may include expected outcomes for each independent event scenario with respect to the properties associated with the static input data 80. In this way, the quantum health state model 76 may provide a plurality of expected health states for individuals during various weather events provided in the event scenario data 82 for the static input data 80, which may correspond to a particular period of time. That is, the static input data 80 may be collected at periodic intervals and the quantum health state model 86 may be updated accordingly.

The expected outcomes provided by the quantum health state model 76 may include expected health states of individuals or the like due to the respective weather event. Referring back to the hurricane event mentioned above, the expected outcomes may include expected health state data for individuals present in the area as the hurricane event progresses through the area.

Keeping this in mind, although the quantum health state model 76 determines the plurality of expected health states for various individuals for each weather event simultaneously, none of the expected health states are observed within the quantum health state model 76. Instead, each expected health states of the quantum health state model 76 exists in superposition with each other at the same time. That is, the quantum computing prediction system 12 has determined each of the expected health states for individuals during each of the weather events provided in the event scenario data 82 at the same time. In other words, the quantum model generator 72 receives the input data (e.g., static input data 80, event scenario data 82) and determines all of the event solutions or expected health states in superposition. As a result, a quantum health state model 76 evaluates all of the input conditions and health state solutions at the same time (e.g., in superposition).

To glean or determine a subset of the expected health states or the event analysis solution, the quantum health state model 76 is provided to the solution filter system 74, which may filter the least likely expected outcomes or the expected outcomes that have less than some threshold probability of occurring. The solution filter system 74 may sweep away less likely solutions without observing the expected health states of the quantum health state model 76 by applying a quantum search algorithm that may be used for unstructured searches. In some embodiments, the quantum search algorithm may include Grover's algorithm, which may identify the expected health state for each individual during each weather event that has a probability of occurring that is greater than some upper threshold. As such, the resulting health state analysis solution 78 may provide a collection of expected health states for individuals during the various weather events to enable other entities to prepare for the weather event. In some embodiments, based on the expected health states provided in the health state analysis solution 78, the quantum computing prediction system 12 may send notifications to individuals or devices provided in FIG. 1 to notify the individuals that may be located within a proximity of an individual that may be experiencing a negative health state. In addition, the quantum computing prediction system 12 may adjust operations of devices located in a proximity of the individual that may be experiencing the negative health state to assist the individual. In this way, individuals may be provided assistance when needed and devices may adjust operations or states (e.g., on/off) to assist the individual improve his health state due to the expected weather event.

Although the health state analysis solution 78 may include the highest likely expected outcomes of the quantum health state model 76, the probabilities may change as more new data is received. That is, the dynamic input data 84 may include real time data or data that corresponds to the static input data 80 received after the static input data 80 and may be used to allow the solution filter system 74 to collapse the expected outcomes of the quantum health state model 76 to fewer likely solutions. For instance, the dynamic input data 84 may include real time sensor measurements from the wearable devices 28, the smart building sensors 26, the vehicle system 18, the smart home sensors 29, the smart mobile devices 48, the cameras 20, the traffic light 22, the wind sensor 38, or any other suitable device described above in FIG. 1, as well as those not detailed in FIG. 1.

The dynamic input data 84 may provide additional context to the solution filter system 74 to filter the unlikely expected outcomes from the quantum health state model 76. That is, as more updated information becomes available from the various sources mentioned above, each of the simultaneously identified expected outcomes of the quantum health state model 76 are associated with a changing probability of occurrence. For instance, if the wind sensor 38 detects that the wind has a certain amount of force in a particular direction, the expected outcomes determined by the quantum health state model 76 that correspond to the same direction will increase in likelihood. As a result, the solution filter system 74 may identify the expected outcomes that are more likely to occur in light of the dynamic input data 84.

By incorporating dynamic input data 84 with the quantum health state model 76, the quantum computing prediction system 12 may determine solutions or expected outcomes in real time by collapsing on a solution that accounts for the simultaneously acquired data from the various data sources. In this way, notifications for individuals and entities may be provided in a timely (e.g., real time) manner, such that they may reach out and help those individuals that may be in a negative health state. In addition, the notifications may be provided to devices to allow the devices to coordinate into various states to alleviate stress for the individual, allow other individuals to more quickly locate the individual in a negative health state, or the like. For instance, a notification provided to the vehicle system 18 may cause the vehicle system 18 to engage in an autonomous mode regardless of the current operational status of the vehicle 16 to move the vehicle 16 to a location that will reduce risk of damage. By way of example, if the health state analysis solution 78 indicates that an individual is in a negative health state and located within the vehicle 16, the quantum computing prediction system 12 may send a notification to the vehicle system 18 that may cause the vehicle system 18 to engage and move the vehicle 16 to location to allow the individual to seek help or meet with another individual.

Figure 4:
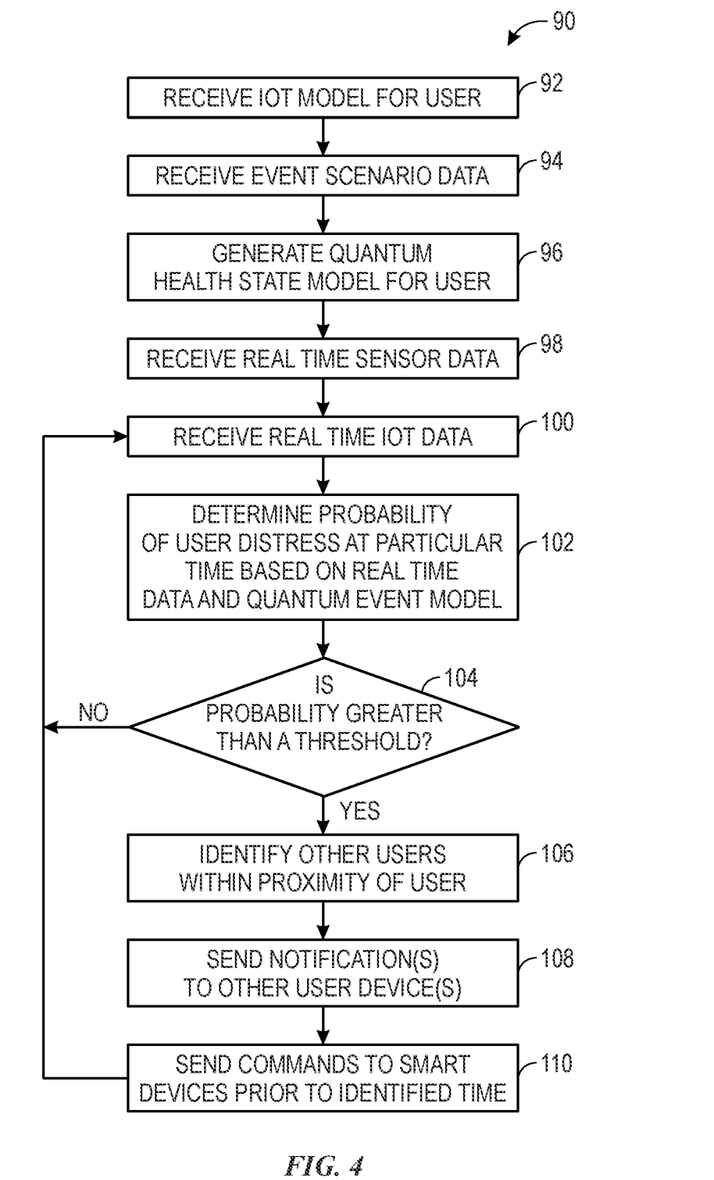
FIG. 4 is a flowchart of a method for providing notifications related to distressed individuals located in a particular area based on combinatorial analysis of event data and data acquired from internet-of-things (IoT) data, in accordance with aspects of the present disclosure.

With the foregoing in mind, FIG. 4 illustrates a flow chart of a method 90 for providing notification related to individuals expected to experience some health event or some health state in a particular area based on combinatorial analysis techniques described herein. That is, the method 90 involves simultaneously analyzing the combinatorial outcomes of weather events based on internet-of-things (IoT) data that may be available in real time. Although the following description of the method 90 is described in a particular order, it should be noted that the method 90 may be performed in any suitable order. Additionally, although the method 90 is described as being performed by the quantum computing prediction system 12, it should be understood that any suitable quantum computing system may perform the method 90.

Referring now to FIG. 4, at block 92, the quantum computing prediction system 12 may receive Internet-of-Things (IoT) data concerning a number of individuals from any suitable sources described above with reference to FIG. 1. The IoT data may include the static input data 80 described above. Generally, the IoT data may provide health state data, location data, and other data acquired while various individuals perform certain tasks throughout a period of time.

At block 94, the quantum computing prediction system 12 may receive the event scenario data 82 described above with reference to FIG. 3. In some embodiments, the event scenario data 82 may be provided in response to detecting a weather event or after detecting forecast information in news data of the electronic news database 44. After detecting the weather event, the event scenario data 82 may be used by the quantum computing prediction system 12 to begin a combinatorial analysis of a plurality of health states across the respective geographic area for various individuals during different weather events.

At block 96, the quantum computing prediction system 12 may generate the quantum health state model 76 mentioned above. As such, the quantum health state model 76 may include the expected health states for all of the combinatorial analysis performed by the quantum computing prediction system 12. Indeed, the quantum health state model 76 may evaluate all possible projected paths of the weather event provided in the event scenario data 82 with respect to locations and health data of individuals in the same area. By employing the qubit processor 54 and the qubit memory 58, the quantum computing prediction system 12 may simultaneously evaluate the possible expected health state (e.g., anxiety level, heartrate, pulse rate, perspiration) in superposition.

At block 98, the quantum computing prediction system 12 may receive real time sensor data (e.g., dynamic input data 84) from various data sources regarding the projected path of the weather event. For example, the quantum computing prediction system 12 may receive updated data from the data sources in the system 10 or other datasets from other sensors 46 disposed in the respective geographic area. As mentioned above, the real-time data may enable the quantum computing prediction system 12 (e.g., via the solution filter system 74) to determine probabilities of the path in which the weather event may travel in particular sections of the respective geographic area. That is, the real-time data or the dynamic input data 84 described above may be provided to allow the quantum computing prediction system 12 at block 98 may cause the parallel weather events existing in superposition to collapse to a limited number of expected outcomes that have more than a threshold probability to occur. Indeed, as more recent and real-time data becomes available, the projected paths for the weather event becomes less uncertain.

At block 100, the quantum computing prediction system 12 may receive updated or real time IoT data related to the various individuals monitored with the IoT data received at block 92. In this way, the real-time IoT data may be provided to the solution filter system 74 to filter solutions from the quantum health state model 76 for expected health states that are unlikely to occur for certain individuals based on the expected paths of the weather events. That is, the real-time sensor data and the real-time IoT data received at blocks 98 and 100 may be provided as dynamic input data to allow the solution filter system 74 to collapse on health state analysis solutions 78 that provide health state data for individuals being monitored.

At block 102, the quantum computing prediction system 12 may evaluate the probability of an expected health state for each individual based on the quantum health state model 76 in view of the real-time data received at blocks 98 and 100 with respect to some threshold. By way of example, the probabilities may be determined based on historical health state data or measurements that occurred for other individuals that may be part of the same cluster of demographics in light of similar weather events, paths, types of force, types of properties, and the like. After the probability of any expected health state at various times at the present moment or in the future for any individual exceeds some threshold, the quantum computing prediction system 12 may proceed to block 104. Otherwise, the quantum computing prediction system 12 may return to block 98 and continue to receive the real-time sensor data. It should be noted that the expected health states for the individuals is determined relative to the expected weather event and expected path over time. As such, the quantum computing prediction system 12 may predict whether a probability of an individual being in a negative health state (e.g., health state data above or below a threshold) during the course of the weather event over a period of time that corresponds to the expected path of the weather event will be greater than some threshold at some time in the present or in the future. Indeed, the quantum computing prediction system 12 may make this determination based on clusters of similar individuals and their corresponding health state data during the course of other weather events and correlations that the quantum computing prediction system 12 may attribute to the respective individual.

If, at block 104, the quantum computing prediction system 12 determines that any of the expected health state measurements of the quantum health state model 76 corresponds to a negative health state (e.g., exceeds the threshold or falls below the threshold), the quantum computing prediction system 12 may proceed to block 106. At block 106, the quantum computing prediction system 12 may identify other individuals that may be located within a threshold distance or proximity to the individual associated with the negative health state. In some embodiments, the quantum computing prediction system 12 may determine the current locations of individuals based on the IoT data received at block 100. However, it should be noted that, in other embodiments, the quantum computing prediction system 12 may query the quantum health state model 76 or the IoT model received at block 92 to identify individuals that are expected to be located within the threshold distance or proximity of the individual with the negative health state.

At block 108, the quantum computing prediction system 12 may send a notification to any device that corresponds to an individual located within the threshold distance or proximity of the individual with the negative health state. In some embodiments, the current locations of the users or devices may be retrieved via the system 10 of FIG. 1. That is, devices worn by or associated with users may provide location information via location sensors (e.g., global positioning system) to the quantum computing prediction system 12. In the same manner, the devices in structures or buildings may provide an indication regarding their respective locations.

After identifying the individuals located within the threshold distance from the individual in a negative health state, the quantum computing prediction system 12 may, at block 108, send a notification indicative of the individual's location to the devices associated with other individuals identified at block 106. In some embodiments, the notification may also include some indication related to the negative health state for the respective individual. For example, the notification may include the health state data value, the threshold value, and the like. In some embodiments, the notification may cause the receiving computing device to automatically execute an application to provide directions to the individual's location based on the current location of the receiving device. That is, the notification, when received by a respective device, may cause the device to automatically execute an application or program regardless of whether the application or program was currently active. In this way, the application or program may provide a visual, haptic, audible, or other suitable notification that may allow a respective user to become aware of the individual in need and his proximity to the respective device. Since the weather event is projected to reach the user's or device's location within a certain period of time, the ability of the respective device to receive and perform an action (e.g., generate alert/visualization) within a certain among of time may enable the individual in a negative health state to receive support more quickly.

In some embodiments, at block 110, the quantum computing prediction system 12 may send commands to smart devices that may be located in the projected path of the weather event or within the proximity of the location of the user identified at block 104. The commands may cause the smart devices to perform certain tasks to reduce any potential damage that may occur due to the weather event or provide instructions for assisting the individual to calm down or improve his health state. For example, smart home sensors 29 may coordinate with other automation devices within the home to lock doors, close blinds, power down devices, or perform other suitable actions to reduce any negative effects of a weather event and improve the health state of the respective individual. In the same way, the vehicle system 18 may automatically move to a safe location, as mentioned above.

In some embodiments, the commands sent to smart devices may provide the individuals that receive the notification at block 108 to locate the individual in a negative health state. That is, for example, the smart devices may coordinate lights to provide a pattern that directs the individual to the individual in need. In addition, some smart devices may provide audio alerts to help the individual locate the individual in need, the vehicle system 18 may route the individual to the location of the individual in need, and the like.

The quantum computing prediction system 12 may continue to perform the method 90 (e.g., blocks 100-110) as more data becomes available. In this way, even as the weather event changes paths, individuals' health states changes, individuals' locations change, and the like, users and devices are notified in real time to allow efficient changes to plans or procedures. By employing the techniques describes herein, the quantum computing prediction system 12 may provide improved response time for users and devices to assist those in with negative health states during weather events as the conditions change in real time and as detected by data acquired via the system 10.

Indeed, different weather events are often analyzed with prediction algorithms that provide probabilistic estimates of affected areas, durations, severity for a locale, and so forth (e.g., multiple predicted trajectories or paths for a storm). By employing the quantum computing prediction system 12 for predictive analysis, quantum computing combinatorial analysis can be performed with IoT data from smart home devices to predict whether individuals will be in a negative health state for the weather event. As such, the quantum computing prediction system 12 may issue notifications to users and devices sooner, combine analysis of different models (e.g., flooding, wind, topography of land and how it will affect wind) to provide damage assessments, use data to tailor alerts to responders, and the like.

While only certain features of the embodiments described herein have been illustrated and described herein, many modifications and changes will occur to those skilled in the art. It is, therefore, to be understood that the appended claims are intended to cover all such modifications and changes as fall within the true spirit of the embodiments described herein. In addition, although the foregoing description is detailed as being performed by a quantum computer, it should be noted that classical processing and computer systems may perform the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving, via at least one qubit processor, static input data comprising a first dataset associated with a plurality of health states for a plurality of individuals over a period of time with respect to a plurality of respective locations;
receiving, via the at least one qubit processor, event scenario data comprising a plurality of expected paths for one or more weather events;
generating, via the at least one qubit processor, a quantum health state model based on the static input data and the event scenario data, wherein the quantum health state model is configured to evaluate each of the plurality of health states with respect to the plurality of individuals at the plurality of respective locations and the one or more weather events in superposition;
receiving, via the at least one qubit processor, dynamic input data comprising a second dataset associated with the plurality of individuals and a plurality of sensors acquired after the first dataset, wherein the second dataset comprises a plurality of updated health states for the plurality of individuals, a plurality of updated respective locations for the plurality of individual, updated data related to the plurality of expected paths, or any combination thereof;
determining, via the at least one qubit processor, that an individual of the plurality of individuals is associated with a health data value that is greater than a threshold based on the quantum health state model and the dynamic input data;
identifying, via the at least one qubit processor, one or more individuals associated with one or more devices located within a threshold distance of an expected location of the individual; and
automatically transmitting, via the at least one qubit processor, one or more notifications indicative of the expected location to the one or more devices.

2. The method of claim 1, wherein the plurality of sensors comprises one or more smart building sensors, one or more wind sensors, one or more water sensors, one or more cameras, one or more speedometers, one or more wearable devices, or any combination thereof.

3. The method of claim 1, wherein the event scenario data is detected based one or more news sources stored in an electronic news database.

4. The method of claim 1, wherein the dynamic input data comprise real time data acquired from the plurality of sensors.

5. The method of claim 1, wherein determining the individual of the plurality of individuals being associated with the health data value that is greater than the threshold is determined based on a solution filter applied to the quantum health state model in view of the dynamic input data.

6. The method of claim 5, wherein the solution filter comprises Grover's algorithm.

7. A non-transitory quantum computer-readable medium comprising quantum-computer executable instructions that, when executed, cause at least one qubit processor to perform operations comprising:
receiving static input data comprising a first dataset associated with a plurality of heath states for a plurality of individuals over a period of time with respect to a plurality of respective locations;
receiving event scenario data comprising a plurality of expected paths for one or more weather events;
generating a quantum health state model based on the static input data and the event scenario data, wherein the quantum health state model is configured to evaluate each of the plurality of health states with respect to the plurality of individuals at the plurality of respective locations and the one or more weather events in superposition;
receiving dynamic input data comprising a second dataset associated with the plurality of individuals and a plurality of sensors acquired after the first dataset, wherein the second dataset comprises a plurality of updated health states for the plurality of individuals, a plurality of updated respective locations for the plurality of individual, updated data related to the plurality of expected paths, or any combination thereof;
determining that an individual of the plurality of individuals is associated with a health data value that is greater than a threshold based on the quantum health state model and the dynamic input data;
identifying one or more individuals associated with one or more devices located within a threshold distance of an expected location of the individual; and
automatically transmitting one or more notifications indicative of the expected location to the one or more devices.

8. The non-transitory quantum computer-readable medium of claim 7, wherein the plurality of health states is detected via a plurality of wearable devices.

9. The non-transitory quantum computer-readable medium of claim 8, wherein each of the plurality of wearable devices is configured to measure a heartrate, a pulse, a perspiration level, or any combination thereof.

10. The non-transitory quantum computer-readable medium of claim 7, wherein the quantum health state model comprises one or more correlations between the plurality of health states and one or more clusters of the plurality of individuals.

11. The non-transitory quantum computer-readable medium of claim 10, wherein the one or more clusters is identified based on demographic data.

12. The non-transitory quantum computer-readable medium of claim 7, wherein the at least one qubit processor is configured to determine that the individual of the plurality of individuals is associated with the health data value that is greater than the threshold by applying a quantum search algorithm to the quantum health state model based on the dynamic input data.

13. The non-transitory quantum computer-readable medium of claim 7, wherein the health data value corresponds to a heartbeat, a pulse, or both.

14. The non-transitory quantum computer-readable medium of claim 7, wherein the one or more weather events comprise a hurricane, a flood, a wildfire, a tornado, or any combination thereof.

15. A system, comprising:
a plurality of wearable devices;
a plurality of sensors disposed in a geographic area; and
a quantum computing system configured to:
receive static input data comprising a first dataset associated with a plurality of health states for a plurality of individuals over a period of time with respect to a plurality of respective locations;
receive event scenario data comprising a plurality of expected paths for one or more weather events;
generate a quantum health state model based on the static input data and the event scenario data, wherein the quantum health state model is configured to evaluate each of the plurality of health states with respect to the plurality of individuals at the plurality of respective locations and the one or more weather events in superposition;

receive dynamic input data comprising a second dataset associated with the plurality of individuals and a plurality of sensors acquired after the first dataset, wherein the second dataset comprises a plurality of updated health states for the plurality of individuals, a plurality of updated respective locations for the plurality of individual, updated data related to the plurality of expected paths, or any combination thereof;

determine that an individual of the plurality of individuals is associated with a health data value that is greater than a threshold based on the quantum health state model and the dynamic input data;

identify one or more individuals associated with one or more devices located within a threshold distance of an expected location of the individual; and automatically transmit one or more notifications indicative of the expected location to the one or more devices.

16. The system of claim 15, wherein the plurality of health states is detected via the plurality of wearable devices.

17. The system of claim 16, wherein each of the plurality of wearable devices is configured to measure a heartrate, a pulse, a perspiration level, or any combination thereof.

18. The system of claim 15, wherein the quantum health state model comprises one or more correlations between the plurality of health states and one or more clusters of the plurality of individuals.

19. The system of claim 15, wherein the event scenario data is detected based one or more news sources stored in an electronic news database.

20. The system of claim 15, wherein the dynamic input data comprise real time data acquired from the plurality of sensors.

* * * * *